United States Patent
Longnecker et al.

(10) Patent No.: US 9,134,787 B2
(45) Date of Patent: Sep. 15, 2015

(54) POWER-GATING IN A MULTI-CORE SYSTEM WITHOUT OPERATING SYSTEM INTERVENTION

(75) Inventors: Matthew Raymond Longnecker, San Jose, CA (US); Scott Alan Williams, San Jose, CA (US); Sagheer Ahmad, Cupertino, CA (US); Robert Alan Bignell, San Jose, CA (US); Venkata Krishna Reddy Dumpa, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 345 days.

(21) Appl. No.: 13/360,559

(22) Filed: Jan. 27, 2012

(65) Prior Publication Data
US 2013/0198549 A1   Aug. 1, 2013

(51) Int. Cl.
*G06F 1/32*   (2006.01)
*G06F 9/32*   (2006.01)

(52) U.S. Cl.
CPC ............ *G06F 1/3237* (2013.01); *G06F 1/3206* (2013.01); *G06F 9/327* (2013.01); *Y02B 60/1221* (2013.01)

(58) Field of Classification Search
CPC ............... G06F 1/24; G06F 1/26; G06F 1/32; G06F 1/3203; G06F 1/3206; G06F 9/327; G06F 9/4418; G06F 1/3237; Y02B 60/1221
USPC .......................................... 713/324, 323, 300
See application file for complete search history.

(56) References Cited

U.S. PATENT DOCUMENTS

| | | | |
|---|---|---|---|
| 6,314,515 B1 * | 11/2001 | Miller et al. ....................... 713/1 |
| 6,732,280 B1 * | 5/2004 | Cheok et al. ................... 713/300 |
| 8,166,324 B2 * | 4/2012 | Youngs ........................ 713/323 |
| 2003/0101362 A1 * | 5/2003 | Dia .............................. 713/300 |
| 2003/0120910 A1 * | 6/2003 | Schmisseur et al. .............. 713/2 |
| 2005/0154931 A1 * | 7/2005 | Oh ................................ 713/300 |
| 2008/0209233 A1 * | 8/2008 | Kumar et al. ................. 713/300 |
| 2008/0307244 A1 * | 12/2008 | Bertelsen et al. ............. 713/323 |
| 2009/0172423 A1 * | 7/2009 | Song et al. .................... 713/300 |
| 2009/0235260 A1 * | 9/2009 | Branover et al. ............. 718/102 |
| 2009/0259863 A1 * | 10/2009 | Williams et al. .............. 713/323 |
| 2009/0292934 A1 * | 11/2009 | Esliger .......................... 713/323 |
| 2009/0300396 A1 * | 12/2009 | Watanabe ..................... 713/324 |
| 2010/0153763 A1 * | 6/2010 | Sood .............................. 713/324 |
| 2010/0162014 A1 * | 6/2010 | Memon et al. ................ 713/320 |
| 2011/0314314 A1 * | 12/2011 | Sengupta ..................... 713/323 |
| 2012/0047402 A1 * | 2/2012 | Chen et al. .................. 714/38.13 |
| 2012/0102344 A1 * | 4/2012 | Kocev et al. .................. 713/322 |
| 2013/0124890 A1 * | 5/2013 | Priel et al. .................... 713/320 |

* cited by examiner

*Primary Examiner* — Thomas Lee
*Assistant Examiner* — Danny Chan
(74) *Attorney, Agent, or Firm* — Artegis Law Group, LLP

(57) ABSTRACT

To preserve power and increase the overall efficiency of the CPU, the platform idle driver causes the power gate controller to cut power to the idle core. Such power gating is autonomous, i.e., the operating system and the other cores are not involved. In operation, the platform idle driver first prepares the core and the power gate controller for power gating the core. The platform idle driver then triggers the power gating. The power gate controller monitors interrupts released by the interrupt controller, and if any on the released interrupts are associated with the power gated core, the power gate controller resumes dispersing power to the core.

25 Claims, 4 Drawing Sheets

POWER-GATING IN A MULTI-CORE SYSTEM WITHOUT OPERATING SYSTEM INTERVENTION

BACKGROUND OF THE INVENTION

1. Field of the Invention

The present invention relates generally to computer hardware and, more specifically, to a system and method for autonomously power-gating an idle core in a multi-core system.

2. Description of the Related Art

In a multi-core processing environment, an operating system distributes tasks for execution to multiple cores within the processing environment. When a core processes the tasks received from the operating system, the core becomes idle. An idle core wastes power because the core is not executing any tasks but is still turned on and consuming power. In devices where power is a limited resource, for example in mobile devices, such wastage of power is highly undesirable.

One solution to the above-mentioned problem involves the operating system recognizing that the core has become idle and causing the core to be powered down. In this approach, the operating system is heavily involved in determining when to power down the core and power up the core. Further, the operating system stops scheduling work on the powered down core and migrates threads that were previously executing on the powered down core to other cores within the processing environment. These operations performed by the operating system impose an undesirably high processing and time penalty for entering and exiting the powered down state.

As the foregoing illustrates, what is needed in the art is an improved technique for powering down idle cores that overcomes the drawbacks associated with conventional approaches.

SUMMARY

One embodiment of the invention sets forth a computer-implemented method for power-gating an idle core included in a multi-core processing environment. The method includes the steps of cutting the power supply to a core included in the multi-core processing environment core that is idle, monitoring one or more interrupts released by an interrupt controller, determining that a first interrupt included in the one or more interrupts is associated with the core, and resuming the supply of power to the core based on the first interrupt.

Advantageously, because the platform idle driver configures and causes the core to power down autonomously, the operating system is not involved in the process and is not responsible for monitoring the state of the idle core. Further, because the power gated core resumes normal function when interrupts are received, threads associated with the power gated core do not need to be migrated to other cores within the CPU. These advantages reduce the processing and time penalty for entering and exiting a power-gated state, such that idle cores are able to enter into the power gated state more often and faster. Therefore, the overall power consumption of the CPU is more efficient and optimal.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring embodiments of the invention.

System Overview

Figure 1:
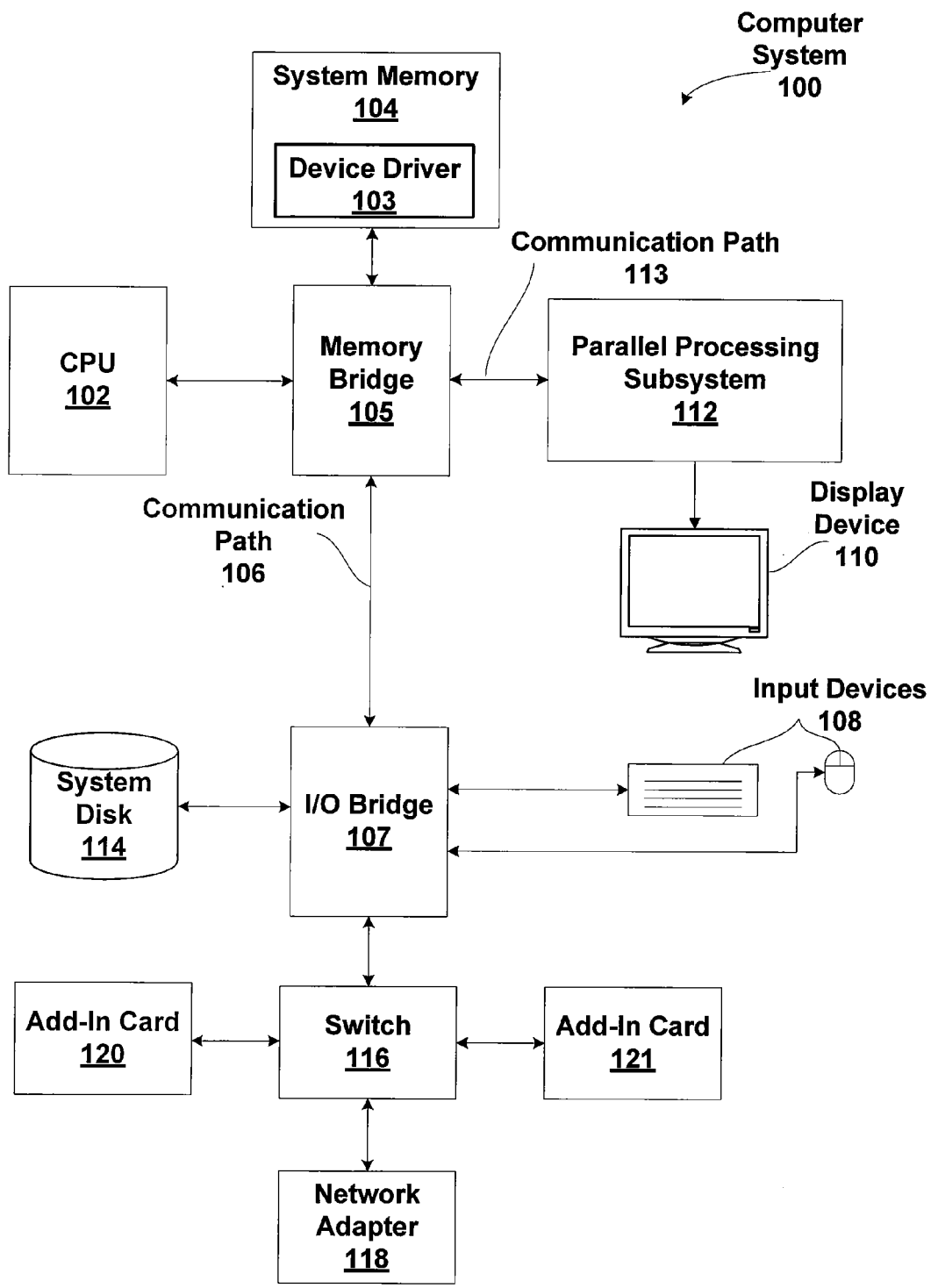
FIG. 1 is a block diagram illustrating a computer system configured to implement one or more aspects of the invention.

FIG. 1 is a block diagram illustrating a computer system 100 configured to implement one or more aspects of the invention. Computer system 100 includes a central processing unit (CPU) 102 and a system memory 104 communicating via a bus path through a memory bridge 105. The CPU 102 includes one or more cores, as described in greater detail herein. Memory bridge 105 may be integrated into CPU 102 as shown in FIG. 1. Alternatively, memory bridge 105, may be a conventional device, e.g., a Northbridge chip, that is coupled to CPU 102 via a bus. Memory bridge 105 is also coupled to an I/O (input/output) bridge 107 via communication path 106 (e.g., a HyperTransport link).

I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture. In yet another embodiment, the parallel processing subsystem 112 may be integrated with one or more other system elements, such as the memory bridge 105, CPU 102, and I/O bridge 107 to form a system on chip (SoC).

It will be appreciated that the system shown in FIG. 1 is illustrative and that variations and modifications are possible. The connection topology, including the number and arrangement of bridges, may be modified as desired. For instance, in some embodiments, system memory 104 is directly connected to CPU 102 rather than connected through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Autonomous Power Gating

Figure 2:
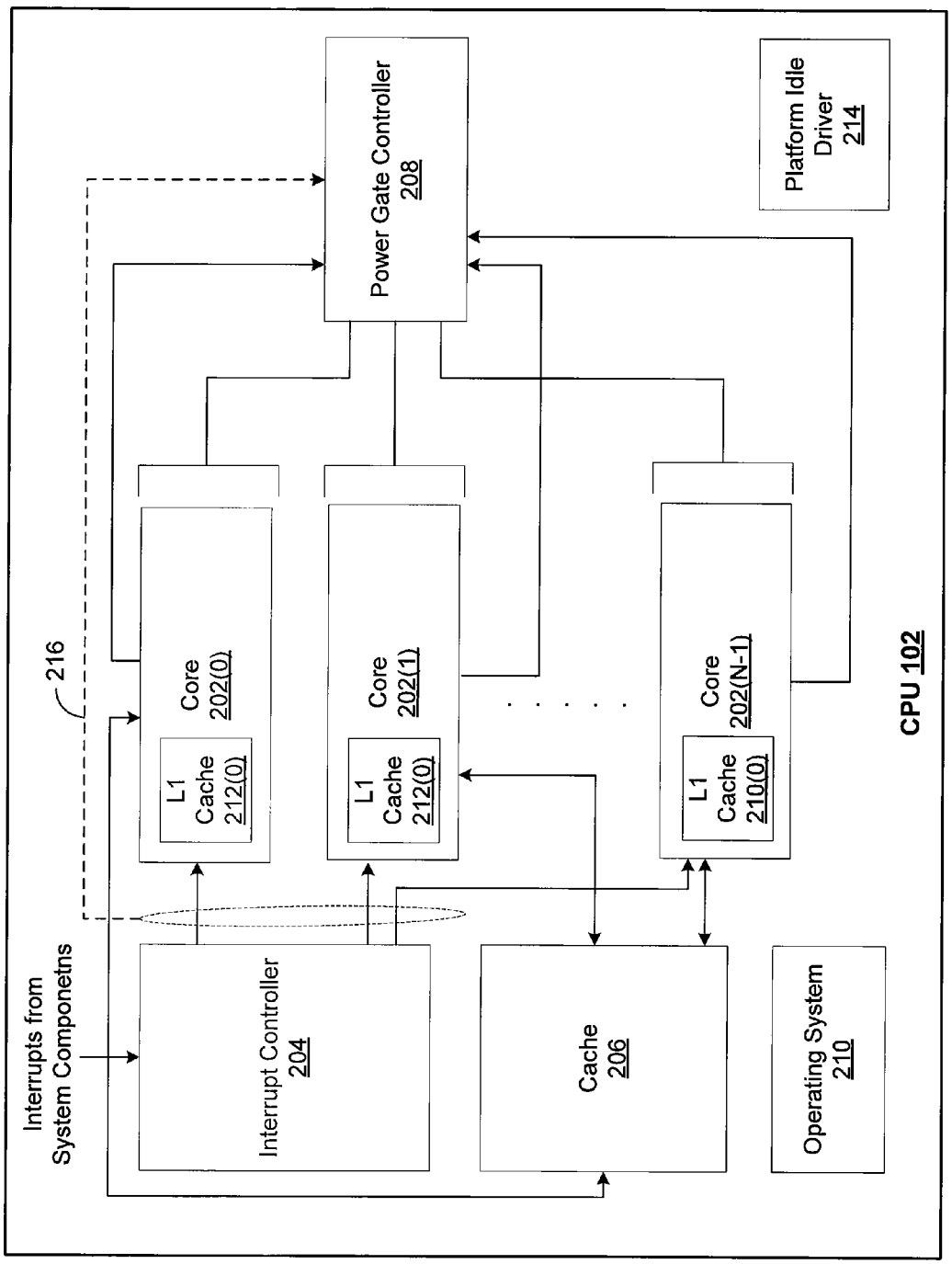
FIG. 2 is a more detailed illustration of the CPU of FIG. 1, according to one embodiment of the invention.

FIG. 2 is a more detailed illustration of the CPU 102 of FIG. 1, according to one embodiment of the invention. As shown, the CPU 102 includes cores 202, an interrupt controller 204, a cache 206, a power gate controller 208 and an operating system 210.

The CPU 102, also referred to herein as the "processing complex," includes multiple cores 202 that share the workload associated with one or more operations to be executed by the CPU 102. The cores 202 may implement substantially the same functionality or may implement a specialized processing element within CPU 102, such as a parallel processor, a general purpose CPU core, or an embedded microcontroller. Various designs are within the scope of embodiments of the invention and may be based on trade-offs in usage for providing the shared functionality. Each core 202 includes an L1 cache 210 and is coupled to the cache 206. The L1 cache 210 in each core 202 caches data related to the execution of the one or more operations and is synchronized with the cache 206.

Each core 202 is coupled to the interrupt controller 204 and the power gate controller 208. The interrupt controller 204 receives system level interrupts from various components within the computer system 100 and distributes those interrupts to the relevant destination components. Interrupts received and distributed by the interrupt controller include, but are not limited to, inter-processor interrupts, timer interrupts, etc. Some interrupts received by the interrupt controller 204 are broadcast to each core 202 included in the CPU 102 while other interrupts are transmitted to only one core 202. The power gate controller 208 controls the amount of power that is dispersed to each core 202. In certain scenarios, as described below, the power gate controller 208 is configured to reduce or cut off power dispersed to cores 202 that are idle.

The operating system 210 manages the execution of the one or more operations within the multiple cores 202. More specifically, the operating system 210 keeps track of which of the cores 202 is available for executing tasks related to the one or more operations. The operating system then schedules those tasks on the available cores accordingly.

A core 202 executes scheduled tasks and, upon completing the scheduled tasks, becomes idle. When the core 202 becomes idle, the operating system 210 causes the core 202 context switches into an "idle thread." The idle thread, when initiated, calls into a pre-determined platform idle driver 214. The platform idle driver 214 is specific to the particular type of core 202 and includes instructions that are executed when the core 202 becomes idle. In one embodiment, the platform idle driver 214 is included in the device driver 103. In another embodiment, the platform idle driver is implemented via one or more specialized instructions supported by the core 202.

To preserve power and increase the overall efficiency of the CPU 102, the platform idle driver 214 causes the power gate controller 208 to cut power to the idle core 202 (referred to herein as "power gating the core 202"). Such power gating is autonomous, i.e., the operating system 210 and the other cores 202 are not involved. Importantly, because the operating system is not aware that the core 202 is power gated, the operating system continues to schedule tasks on the power gated core 202 and the interrupt controller continues to distribute interrupts associated with the power gated core 202.

In operation, the platform idle driver 214 first prepares the core 202 and the power gate controller 208 for power gating the core 202. For the preparation stage, the platform idle driver 214 first disables all interrupts to the core 202 so that the subsequent preparation steps are executed without interruption. The platform idle driver 214 then saves the current state stored in the core 202 so that the state can be recovered when the core 202 is powered up after being power gated. The state is saved to the cache 206 or another memory system within the CPU 102.

Next, the platform idle driver 214 configures the power gate controller 208 to enable the power gating operation. More specifically, the platform idle driver 214 configures the power gate controller 208 to "snoop" interrupts transmitted by the interrupt controller via the snoop link 216 such that any interrupts within a set of pre-determine interrupts cause the power gate controller to power up the core 202 after the core 202 has been power gated. The platform idle driver 214 also configures the power gate controller 208 such that, when triggered, the power gate controller 208 cuts power to the core 202 causing the core 202 to enter into a power gated state.

The platform idle driver 214 also programs a reset vector, which is resident in a memory that is not going to be power gated, to point to a location that stores the instruction to be executed when the core 202 is powered up from the power gated state. The reset vector is also programmed to store the location of the state information that was saved. The platform idle driver 214 then configures wake hardware within the power gate controller 208 to store the location of the reset vector. The wake hardware assists the core 202 when the core 202 is powered up from the power gated state. Finally, the platform idle driver 214 flushes the L1 cache 212 within the core 202 and disables any snooping operations into the L1 cache 212.

After the core 202 and the power gate controller 208 is prepared for power gating, the platform idle driver 214 re-enables all interrupts to the core 202 and triggers the power gating of the core 202. The core 202 remains power gated until the power gate controller 208, via the snoop link 216, identifies an interrupt that should cause the core 202 to be powered up from the power gated state.

When such an interrupt is identified, the power gate controller 208 powers up the core 202. To resume the operation of the core 202, the location that stores the next instructions to be executed by the core 202 is determined based on the reset vector specified by the wake hardware. The next instructions cause the restoration of the state that was saved during the preparation stage and the restoration of the L1 cache 212. Once the state and L1 cache 212 is restored, the core 202 is able to service the interrupt and process any further tasks scheduled by the operating system 210.

Figure 3:
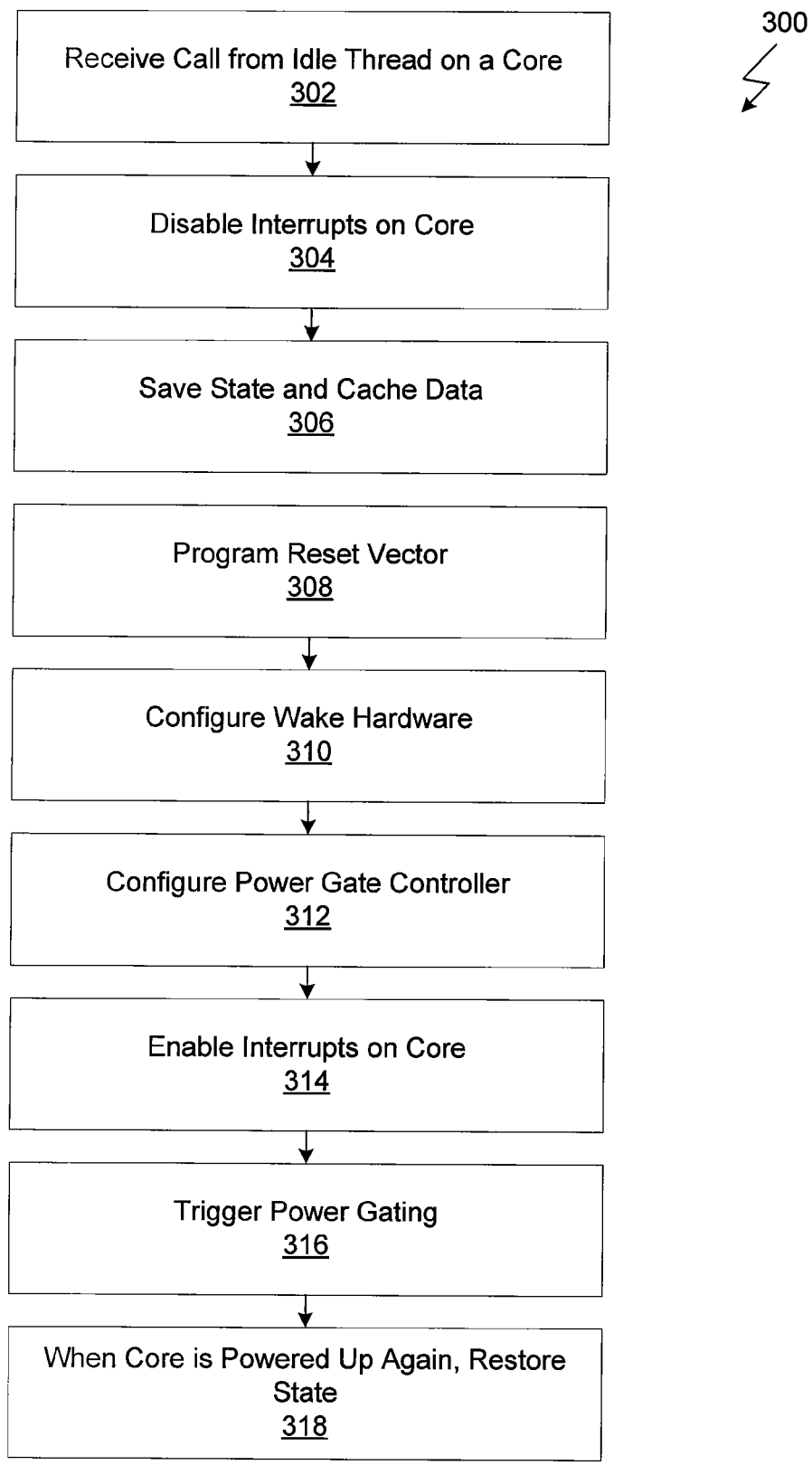
FIG. 3 is a flow diagram of method steps for preparing the idle core for power gating, according to one embodiment of the invention.

FIG. 3 is a flow diagram of method steps for preparing the idle core for power gating, according to one embodiment of the invention. Although the method steps are described in conjunction with the systems of FIGS. 1-2, persons skilled in the art will understand that any system configured to perform the method steps, in any order, is within the scope of embodiments of the invention.

At step 302, the platform idle driver 214 receives a call from the idle thread of a core 202 that has switched into an idle state. At step 304, to prepare the core 202 for being power gated, the platform idle driver 214 disables all interrupts to the core 202 so that the subsequent preparation steps are executed without interruption. At step 306, the platform idle driver 214 then saves the current state stored in the core 202 and flushes the L1 cache 212 within the core 202. The platform idle driver 214 also disables any snooping operations into the L1 cache 212.

At step 308, the platform idle driver 314 programs a reset vector, which is resident in a memory that is not going to be power gated, to point to a location that stores the instruction to be executed when the core 202 is powered up from the power gated state. At step 310, the platform idle driver 214 configures the wake hardware within the power gate controller 208 to store the location of the reset vector. Again, the wake hardware assists the core 202 when the core 202 is powered up from the power gated state.

At step 312, the platform idle driver 214 configures the power gate controller 208 to enable the power gating operation. More specifically, the platform idle driver 214 configures the power gate controller 208 to "snoop" interrupts transmitted by the interrupt controller via the snoop link 216 such that any interrupts within a set of pre-determined interrupts cause the power gate controller to power up the core 202 after the core 202 has been power gated. The platform idle driver 214 also configures the power gate controller 208 such that, when triggered, the power gate controller 208 cuts power to the core 202 causing the core 202 to enter into a power gated state.

At step 314, after the core 202 and the power gate controller 208 is prepared for power gating, the platform idle driver 214 re-enables all interrupts to the core 202. At step 316, the power gate controller 208 triggers the power gating of the core 202. The core 202 remains power gated until the power gate controller 208, via the snoop link 216, identifies an interrupt that should cause the core 202 to be powered up from the power gated state. When such an interrupt is identified, the power gate controller 208 powers up the core 202.

At step 318, to resume the operation of the core 202, the location that stores the next instructions (of the platform idle driver 314) to be executed by the core 202 is determined based on the reset vector specified by the wake hardware. The next instructions cause the restoration of the state that was saved during the preparation stage and the restoration of the L1 cache 212. Once the state is restored, the core 202 is able to service the interrupt and process any further tasks scheduled by the operating system 210.

Figure 4:
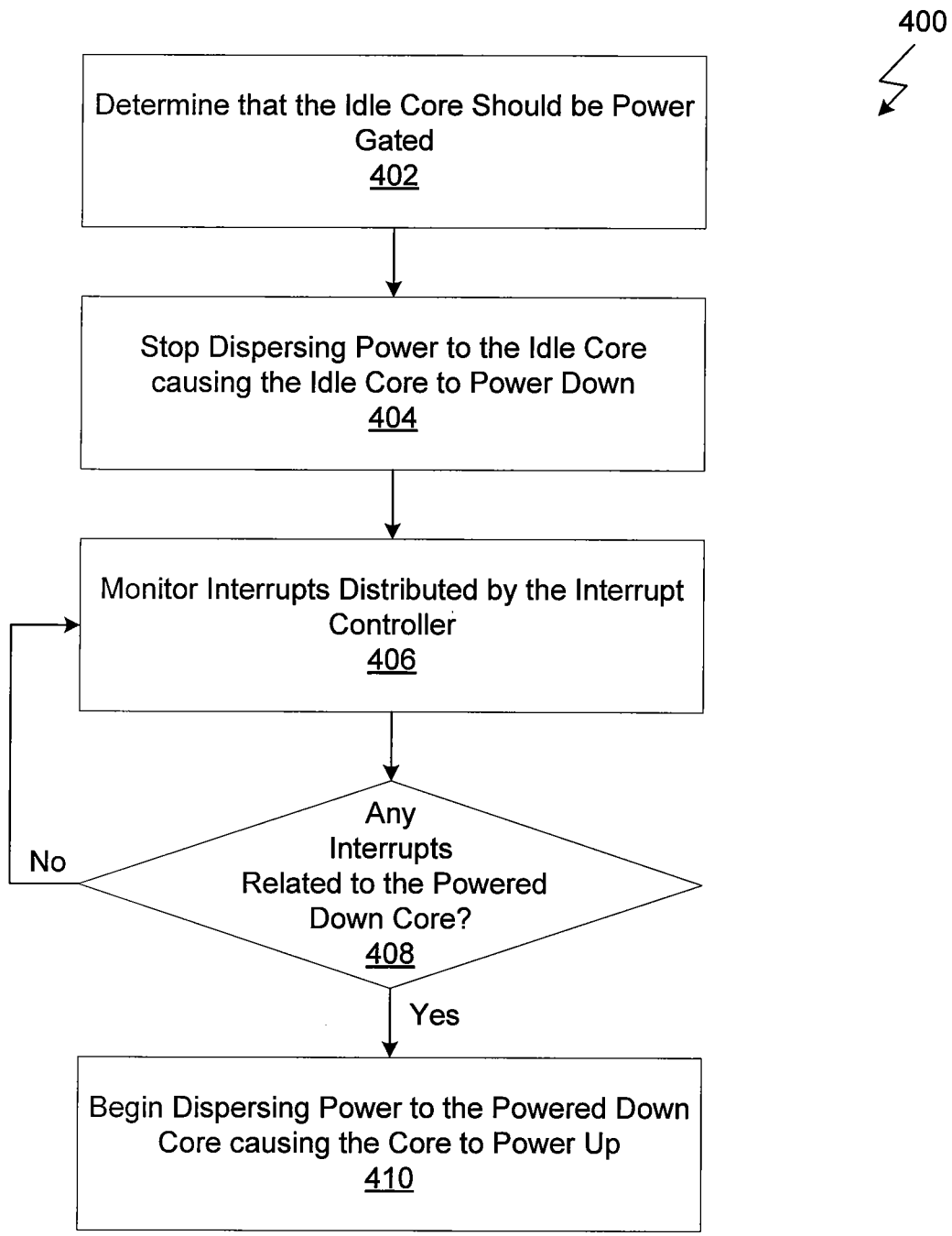
FIG. 4 is a flow diagram of method steps for autonomously power-gating a core within the CPU, according to one embodiment of the invention.

FIG. 4 is a flow diagram of method steps for autonomously power-gating a core within the CPU, according to one embodiment of the invention. Although the method steps are described in conjunction with the systems of FIGS. 1-2, persons skilled in the art will understand that any system configured to perform the method steps, in any order, is within the scope of embodiments of the invention.

The method 400 begins at step 402, where the power gate controller 208 determines that a particular core 202 is idle and should be power gated. In one embodiment, the power gate controller 208 makes such a determination based on an indication received from the platform idle driver 214. However, any technically feasible mechanism via which the power gate controller 208 makes such a determination is within the scope of the invention.

At step 404, the power gate controller 208 stops dispersing power to the idle core 202 causing the idle core 202 to power down. At step 406, the power gate controller 208 monitors the interrupts released by the interrupt controller 204 via the snoop link 216. At step 408, the power gate controller 208 analyzes the interrupts released by the interrupt controller 204 to determine whether any interrupts related to the powered down core 202 were released. In one embodiment, the power gate controller 208 monitors only particular types of interrupts related to the powered down core 202.

If, at step 408, an interrupt related to the powered down core 202 was released, then the method 400 proceeds to step 410. At step 410, the power gate controller 208 powers up the powered down core 202. When powered up, the core 202 services the interrupt(s) and resumes normal function. However, if, at step 408, an interrupt related to the powered down core 202 was not released, then the method 400 returns back to step 406 and continues to monitor the interrupts released by the interrupt controller 204.

Advantageously, because the platform idle driver configures and causes the core to power down autonomously, the operating system is not involved in the process and is not responsible for monitoring the state of the idle core. Further, because the power gated core resumes normal function when interrupts are received, threads associated with the power gated core do not need to be migrated to other cores within the CPU. These advantages reduce the processing and time penalty for entering and exiting a power-gated state, such that idle cores are able to enter into the power gated state more often and faster. Therefore, the overall power consumption of the CPU is more efficient and optimal.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for power-gating an idle core included in a multi-core processing environment, the method comprising:
   disabling processing of interrupts by a core included in the multi-core processing environment that is idle;
   cutting a power supply to the core;
   monitoring one or more interrupts released by an interrupt controller;
   determining that a first interrupt included in the one or more interrupts is associated with the core; and
   in response, resuming the supply of power to the core to allow the core to service the first interrupt, wherein a reset vector points to one or more instructions that the core is to execute upon being powered up.

2. The method of claim 1, further comprising determining that the first interrupt comprises a type of interrupt that should be serviced by the core.

3. The method of claim 2, wherein the first interrupt comprises a timer interrupt associated with the core.

4. The method of claim 2, wherein the first interrupt comprises an inter-processor interrupt transmitted by a different core included in the multi-core processing environment to the core.

5. The method of claim 1, wherein, prior to stopping the dispersal of power to the core, state information associated with the core is stored in a memory external to the core.

6. The method of claim 5, wherein, prior to stopping the dispersal of power to the core, data resident in a first cache that is internal to the core is flushed to a second cache that is external to the core.

7. The method of claim 6, wherein, prior to stopping the dispersal of power to the core, the reset vector is programmed to store a first address associated with a first instruction to be executed when the core is powered on and a second address associated with the saved state information.

8. The method of claim 7, wherein the reset vector is stored in a memory external to the core.

9. The method of claim 8, wherein, when the instruction is executed by the core, the saved state information is restored within the core and the first cache is restored based on data resident in the second cache.

10. The method of claim 1, further comprising continuing to schedule, via an operating system, tasks for the core while the power supply to the core is cut.

11. The method of claim 1, wherein disabling the processing of interrupts by the core is performed prior to cutting the power supply to the core, and further comprising, based on determining that the first interrupt is associated with the core, powering up the core to allow the core to service interrupt and resume normal function.

12. A power gate controller, configured to:
   cut a power supply to a core that is idle and is included in a multi-core processing environment based on a determination that interrupt processing has been disabled for the core;
   monitor one or more interrupts released by an interrupt controller;
   determine that a first interrupt included in the one or more interrupts is associated with the core; and
   in response, resume the supply of power to the core to allow the core to service the first interrupt, wherein a reset vector points to one or more instructions that the core is to execute upon being powered up.

13. The power gate controller of claim 12, further configured to determine that the first interrupt comprises a type of interrupt that should be serviced by the core.

14. The power gate controller of claim 13, wherein the first interrupt comprises a timer interrupt associated with the core.

15. The power gate controller of claim 13, wherein the first interrupt comprises an inter-processor interrupt transmitted by a different core included in the multi-core processing environment to the core.

16. The power gate controller of claim 12, wherein, prior to stopping the dispersal of power to the core, state information associated with the core is stored in a memory external to the core.

17. The power gate controller of claim 16, wherein, prior to stopping the dispersal of power to the core, data resident in a first cache that is internal to the core is flushed to a second cache that is external to the core.

18. The power gate controller of claim 17, wherein, prior to stopping the dispersal of power to the core, the reset vector is programmed to store a first address associated with a first instruction to be executed when the core is powered on and a second address associated with the saved state information.

19. The power gate controller of claim 18, wherein the reset vector is stored in a memory external to the core.

20. The power gate controller of claim 19, wherein, when the instruction is executed by the core, the saved state information is restored within the core and the first cache is restored based on data resident in the second cache.

21. A multi-core processing environment, comprising:
   a plurality of cores;
   an interrupt controller configured to transmit interrupts to the plurality of cores;
   a power gate controller configured to supply power to the plurality of cores and configured to:
     cut a power supply to a core that is idle and is included in a multi-core processing environment based on a determination that interrupt processing has been disabled for the core,
     monitor one or more interrupts released by an interrupt controller,
     determine that a first interrupt included in the one or more interrupts is associated with the core, and
     in response, resume the supply of power to the core to allow the core to service the first interrupt, wherein a reset vector points to one or more instructions that the core is to execute upon being powered up.

22. The multi-core processing environment of claim 21, wherein power gate controller is further configured to determining that the first interrupt comprises a type of interrupt that should be serviced by the core.

23. The multi-core processing environment of claim 21, wherein, while the power supply to the core is cut, an operating system executing within the multi-core processing environment continues to schedule tasks for the core.

24. The multi-core processing environment of claim 23, wherein the power gate controller is further configured to determine that the first interrupt comprises a type of interrupt that should be serviced by the core.

25. The multi-core processing environment of claim 24, wherein interrupt processing by the core is disabled prior to cutting the power supply to the core, and further comprising, based on determining that the first interrupt is associated with the core, powering UP the core to allow the core to service interrupt and resume normal function.

* * * * *

UNITED STATES PATENT AND TRADEMARK OFFICE
CERTIFICATE OF CORRECTION

| | | |
|---|---|---|
| PATENT NO. | : 9,134,787 B2 | Page 1 of 1 |
| APPLICATION NO. | : 13/360559 | |
| DATED | : September 15, 2015 | |
| INVENTOR(S) | : Longnecker et al. | |

It is certified that error appears in the above-identified patent and that said Letters Patent is hereby corrected as shown below:

In the Claims

Column 8, Line 62, Claim 25, please delete "UP" and add --up--.

Signed and Sealed this
Twenty-sixth Day of April, 2016

Michelle K. Lee
*Director of the United States Patent and Trademark Office*